United States Patent
Kotecha (10) Patent No.: US 7,652,984 B1
(45) Date of Patent: Jan. 26, 2010

(54) GEOGRAPHIC REDUNDANCY AND RESOURCE OPTIMIZATION FOR SECURITY GATEWAYS IN WIRELESS NETWORKS

(75) Inventor: Lalit Ratilal Kotecha, Union City, CA (US)

(73) Assignee: Cello Partnership, Basking Ridge, NJ (US)

( * ) Notice: Subject to any disclaimer, the term of this patent is extended or adjusted under 35 U.S.C. 154(b) by 491 days.

(21) Appl. No.: 11/717,663

(22) Filed: Mar. 14, 2007

(51) Int. Cl.
*H04J 1/16* (2006.01)
*H04J 3/14* (2006.01)

(52) U.S. Cl. .................. 370/217; 370/218; 370/338
(58) Field of Classification Search .......... None
See application file for complete search history.

(56) References Cited

U.S. PATENT DOCUMENTS

| | | | | |
|---|---|---|---|---|
| 2002/0186653 | A1* | 12/2002 | Jensen | 370/219 |
| 2004/0186701 | A1* | 9/2004 | Aubin et al. | 703/13 |
| 2005/0147028 | A1* | 7/2005 | Na et al. | 370/217 |
| 2005/0276215 | A1* | 12/2005 | Kitani et al. | 370/217 |
| 2006/0085543 | A1 | 4/2006 | Hrastar et al. | |
| 2006/0218395 | A1 | 9/2006 | Maes | |
| 2007/0100981 | A1 | 5/2007 | Adamczyk et al. | |
| 2007/0183314 | A1* | 8/2007 | Li et al. | 370/217 |
| 2007/0206492 | A1* | 9/2007 | Zelig et al. | 370/218 |
| 2008/0013533 | A1 | 1/2008 | Bogineni et al. | |
| 2008/0037418 | A1* | 2/2008 | Cole et al. | 370/220 |
| 2008/0205264 | A1* | 8/2008 | Rorie | 370/219 |

OTHER PUBLICATIONS

U.S. Appl. No. 11/637,697, filed Dec. 13, 2006, Bogineni et al.

* cited by examiner

*Primary Examiner*—Ajit Patel
(74) *Attorney, Agent, or Firm*—McDermott Will & Emery LLP (57) ABSTRACT

A data communication system has security gateway redundancy for mobile terminal access. A first security gateway provides a first secured communications link between a first mobile user terminal and a telecommunications network over an intermediary network. A second security gateway provides a second secured communications link between a second mobile user terminal and the telecommunications network over the intermediary network. A redundancy mechanism provides a third secured communications link between the second mobile user terminal and the telecommunications network over the first security gateway, when the second security gateway fails.

27 Claims, 5 Drawing Sheets

GEOGRAPHIC REDUNDANCY AND RESOURCE OPTIMIZATION FOR SECURITY GATEWAYS IN WIRELESS NETWORKS

TECHNICAL FIELD

This disclosure relates to wireless communications, and more particularly, to a mechanism for providing redundancy and resource optimization of gateways that enable secured access to Internet Protocol (IP) services.

BACKGROUND

Two key trends are driving development of modern communication technologies. The first is the broad migration to Voice over IP (VoIP), a technology that provides telephone communication services over Internet Protocol (IP) networks. The second is the transition to wireless mobile computing supported by wireless local area networks (WLANs). These trends are combined in the Voice over WLAN (VoWLAN) technology that delivers voice communication services over wireless local area networks.

Voice is a demanding application. It requires near-continuous network transmission and very low packet loss to avoid latencies (gaps in communication) and jitter which can impact clarity. Voice transmission over wireless networks is even more challenging technology because mobile usage introduces additional problems. As users move out of their offices or homes, they may need to interface with the network through several different access points.

The VoWLAN technology is based on a radio access technology such as WiFi (802.11). VoWLAN technology supports connection of a user's handset or other mobile terminal arranged in a WLAN to a wireless network that may be provided by a cellular telecommunications operator. The wireless network may include an IP service network such as IP Multimedia Subsystem (IMS) which is a services overlay on the existing radio access network (RAN) architecture to provide end-to-end IP transport for voice traffic. The IMS is defined by the 3GPP standard as a wireless network infrastructure that enables the convergence of data, voice and mobile network technology. 3GPP2 adopted the IMS framework from 3GPP, and in conjunction with the Packet Data Subsystem (PDS) is referred to as the 'Multi-Media Domain' (MMD).

The IMS framework allows integration of multiple access technologies, such as the cellular RAN and WLAN, e.g. for mobile stations that may have either or both of the cellular and WiFi transceiver capabilities. IMS is designed to provide a number of key functionalities to enable IP services via wireless networks. In particular, IMS uses Session Initiation Protocol (SIP) for multimedia session negotiation and session management. Any type of media sessions may be established, e.g. voice, video, text sessions. For example, IMS enables a mobile user to find another user in the network and to establish a session with that user. The user can connect to an IMS network using IP-based methods. Direct IMS terminals such as mobile phones, PDAs, computers can register directly into an IMS network, even when they are roaming in another network.

The key IMS components enabling mobility management are CSCF (Call Session Control Function) and HSS (Home Subscriber Service). The HSS may include a home location register (HLR) that stores data regarding the valid user's identification, the assigned telephone number, subscription service options terminal capabilities, etc. for each mobile user. The HSS is the master user database supporting the IMS network entities that are actually handling the calls or sessions. It may perform authentication and authorization of the user and can provide information about the physical location of user.

In regular 3GPP networks, user identities may be defined in the following forms: International Mobile Subscriber Identity (IMSI), Temporary Mobile Subscriber Identity (TMSI), International Mobile Equipment Identity (IMEI) and Mobile Subscriber ISDN Number (MSISDN). IMSI is a unique user identity stores in the HSS. To improve privacy, a TMSI is generated per geographic location. While IMSI and TMSI identify users, the IMEI is a unique device identity and is phone specific. The MSISDN is the telephone number of the user.

In addition, the IMS uses IP Multimedia Private Identity (IPMI) and IP Multimedia Public Identity (IMPU). Both are Uniform Resource Identifiers (URIs) that can be digits or alphanumeric identifiers. The IPMI is unique to the phone. Each user may have multiple IMPUs that can be shared with another phone, so both can be reached with the same identity (for example, a single phone number for an entire family).

CSCF servers that process SIP signaling packets in the IMS may include a P-CSCF (Proxy-CSCF) which is the first point of contact for a user's terminal. The P-CSCF may be assigned to a user's terminal during registration. It authenticates the user and establishes a security association with the terminal. P-CSCF can also compress and decompress SIP messages to reduce the round-trip over slow radio links.

The call/session control function also includes an S-CSCF (Serving-CSCF) that handles SIP registrations to allow bonding the user location (e.g. the IP address of the terminal) and the SIP address. It decides to which application server the SIP message will be forwarded in order to provide a required service. Also, S-CSCF provides routing services and enforces the policy of the network operator. An I-CSCF (Interrogating-CSCF) is another SIP function that queries the HSS to retrieve the user location and routes the SIP request to its assigned S-CSCF.

When operating in the WLAN environment, e.g. through a WiFi access point, a user's handset or other mobile terminal is connected to an IMS network via a public IP network, such as the Internet. However, a public IP network is inherently unsecured. Therefore, a secured tunnel is created over the public IP network to connect a user's terminal to a Security Gateway that provides secured access to the IMS. For example, the Security Gateway may be implemented using the security architecture called IPsec and may include protocols for securing IP communications by authenticating and/or encrypting each IP packet in a data stream. Also, the Security Gateway may include protocols for cryptographic key establishment. For example, the Security Gateway functions may be implemented using CSCF servers or using a separate Security Server in an IP service network.

Each Security Gateway provides a large number of connections. Conventionally, the connections established over the Security Gateway are kept active, even when a user is not making voice calls. In case of failure of one of the Security Gateways, network services would be disrupted unless a redundant Security Gateway is provided. In a typical deployment scenario, an additional redundant Security Gateway is provided for each active Security Gateway to maintain connections established via the respective main Security Gateway when it fails for any reason. The redundant Security Gateway is not active until the respective main Security Gateway fails. Such a redundancy arrangement substantially increases the network deployment cost.

Therefore, it would be desirable to develop a redundancy arrangement that does not require redundant Security Gateways.

SUMMARY OF THE DISCLOSURE

A data communication system and method are disclosed herein, which incorporate concepts to address above noted problems with a redundancy arrangement for the IP wireless network.

In accordance with one aspect of the disclosure, the data communication system comprises a first security gateway for providing a first secured communications link between a first mobile user terminal and a telecommunications network over an intermediary network, a second security gateway for providing a second secured communications link between a second mobile user terminal and the telecommunications network over the intermediary network, and a redundancy mechanism for providing a third secured communications link between the second mobile user terminal and the telecommunications network over the first security gateway, when the second security gateway fails. The first and second security gateways may be configured to support Internet protocol (IP) communications between the intermediary network and the telecommunications network.

In accordance with an exemplary embodiment, a first wireless access point may connect the first mobile user terminal to the intermediary network, and a second wireless access point may connect the second mobile user terminal to the intermediary network. The first and second user mobile terminals may be configured to support voice-over-wireless LAN (VoWLAN) communications.

In accordance with another exemplary embodiment, a first base station may be provided for converting a radio communication signal produced by the first mobile user terminal into first IP data supplied to the intermediary network, and a second base station may convert a radio communication signal produced by the second mobile user terminal into second IP data supplied to the intermediary network.

The security gateways may maintain multiple communications links to the telecommunications network. To optimize their resources, the redundancy mechanism may disconnect established communications links from the security gateways in accordance with a predetermined condition.

For example, if the established communications link is idle for a predetermined time period it may be disconnected from the security gateway. Also, the established communications link may be disconnected from the security gateway, when a mobile user terminal associated with the established communications link is detected in a network that does not require connection via this security gateway.

In an example, the telecommunications network includes an IP multimedia subsystem (IMS), and the first and second security gateways are configured to provide secure access to the IMS via a public IP network.

Additional objects, advantages and novel features of the examples will be set forth in part in the description which follows, and in part will become apparent to those skilled in the art upon examination of the following and the accompanying drawings or may be learned by implementation or operation of the examples. The advantages of the present teachings may be realized and attained by practice or use of the methodologies, instrumentalities and combinations particularly pointed out in the appended claims.

BRIEF DESCRIPTION OF DRAWINGS

The following detailed description of the embodiments of the present disclosure can best be understood when read in conjunction with the following drawing figures that depict concepts by way of example, not by way of limitations. In the figures, like reference numerals refer to the same or similar elements.

DETAILED DISCLOSURE OF THE EMBODIMENTS

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The present disclosure will be made using the example of a security access to a wireless network with an IP Multimedia Subsystem (IMS). It will become apparent, however, that the concept of the disclosure is applicable to providing redundancy for security access to any data communications network.

Figure 1:
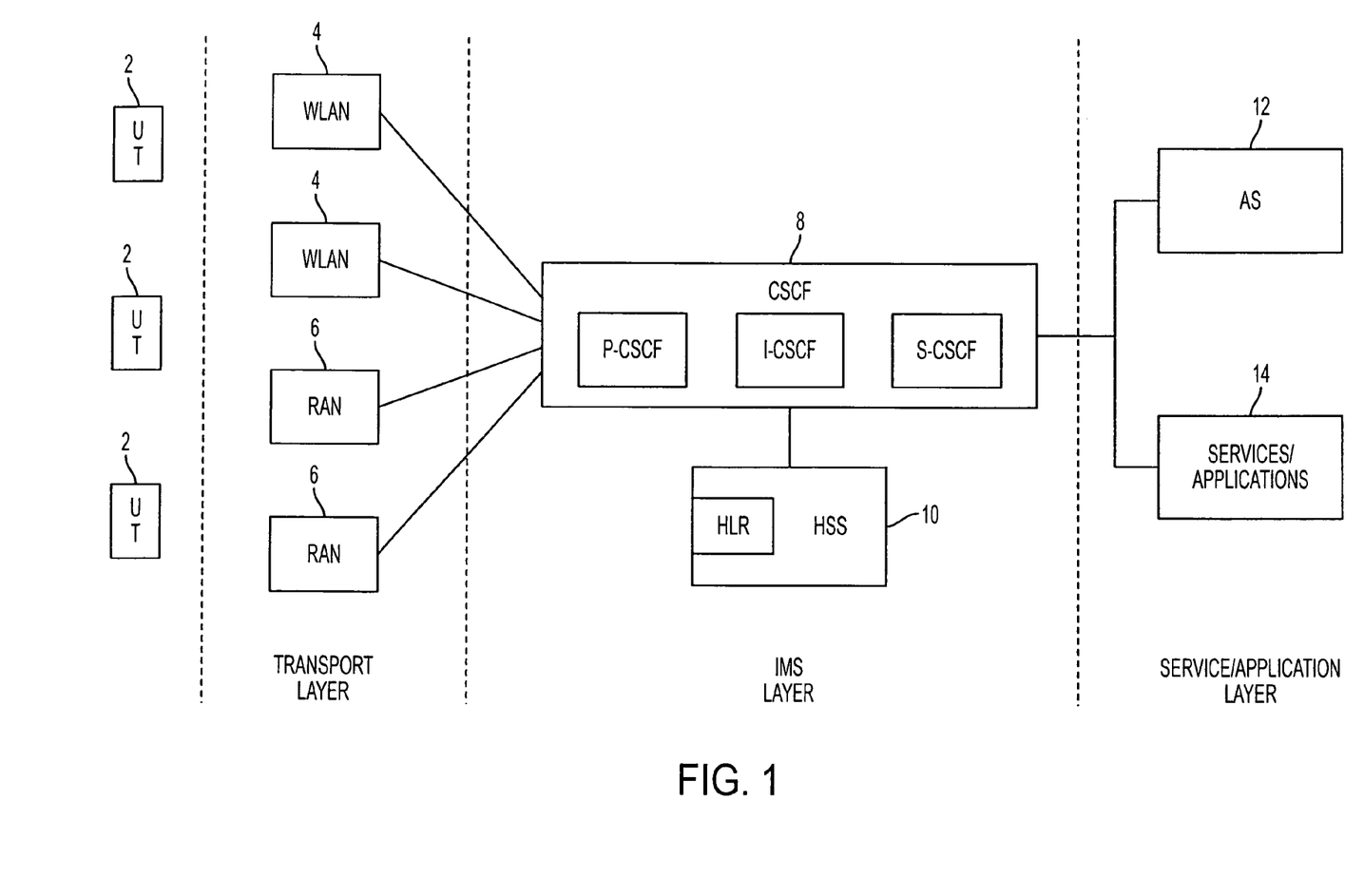
FIG. 1 depicts an exemplary network environment, in which the redundancy arrangement of the present disclosure may be provided.

FIG. 1 schematically illustrates an exemplary data communications environment, in which a system and a method of the present disclosure can be implemented. The data communications environment in FIG. 1 is schematically divided into a transport layer, an IMS layer and a service/application layer defined in the 3GPP standard. The drawing shows multiple user terminals (UT) 2 which may be any devices capable of providing wireless communications, such as personal digital assistants, laptop type personal computers, or wireless mobile telephone stations in the form of handsets. Some of the UTs 2 may be provided with WiFi communication capability. At a transport layer, the WiFi-enabled UTs 2 may be arranged for communications via WiFi access points provided in WLANs 4. Also, the UTs 2 may support communications over cellular radio-access networks (RANs) 6, such as Code Division Multiple Access (CDMA) telephone networks or Global System for Mobile Communications (GSM) telephone networks.

Further, the UTs 2 may have access to the IMS that provides various IP services. The IMS components include CSCF (Call Session Control Function) 8 and HSS (Home Subscriber Service) 10. The HSS may perform authentication and authorization of UTs 2 and can provide information about their physical location. The HSS may include a home location register (HLR) that stores data regarding the valid user's identification, the assigned telephone number, subscription service options, terminal capabilities, etc. for mobile users and their UTs.

The IMS uses Session Initiation Protocol (SIP) to establish and manage multimedia sessions for UTs 2. For example, voice, video, and text sessions may be provided. CSCF servers that process SIP signaling packets may include a P-CSCF (Proxy-CSCF) that may be assigned to UT 2 during registration. It authenticates the user and establishes a security association with the UT 2. P-CSCF can also compress and decompress SIP messages to reduce the round-trip over slow radio links.

The CSCF servers also include an S-CSCF (Serving-CSCF) that handles SIP registrations to provide association between the user location (e.g. the IP address of the terminal) and the SIP address. It decides to which application server the SIP message will be forwarded in order to provide a required service. Also, S-CSCF provides routing services and enforces the policy of the network operator. An I-CSCF (Interrogating-CSCF) is another SIP function that queries the HSS to retrieve the user location and routes the SIP request to its assigned S-CSCF.

Using SIP, the CSCF servers interact with application servers (AS) 12 that host and execute services and applications 14 available in the IMS. Examples of available services and applications include:

caller ID related services,
 call waiting, call holding, push to talk,
 call forwarding, call transfer,
 streaming audio/video,
 lawful interception,
 announcement services, providing multimedia announcements,
 conference call services, multimedia conferencing,
 voicemail, text-to-speech conversion, speech-to-text conversion,
 location based information services,
 instant messaging.

Figure 2:
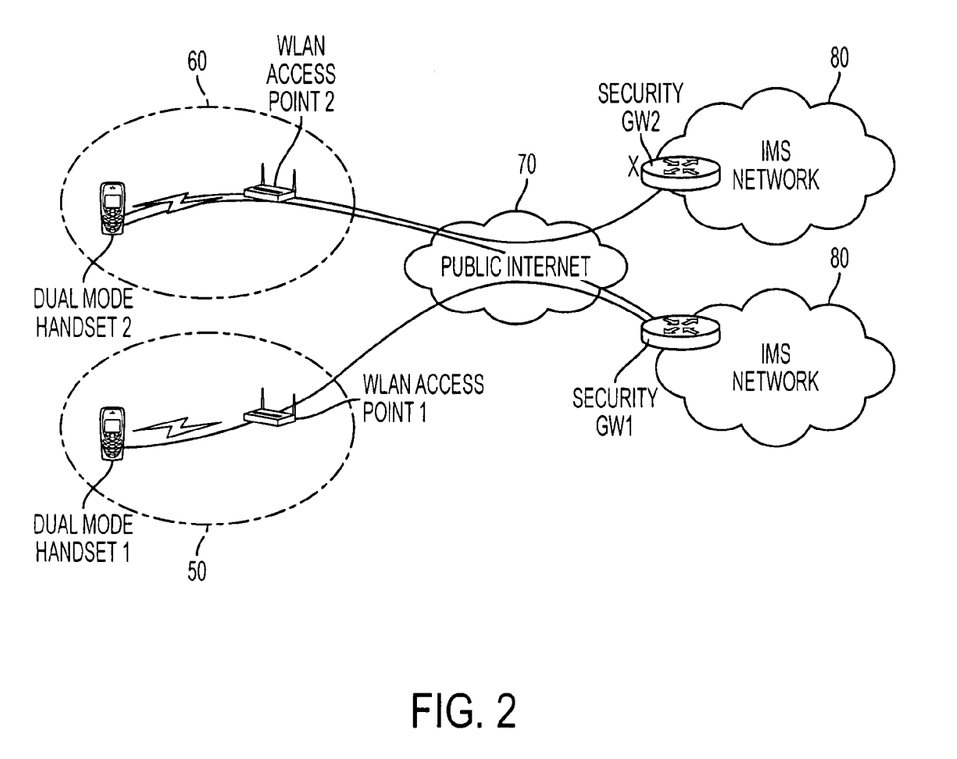
FIG. 2 illustrates an exemplary redundancy arrangement for security gateways.

FIG. 2 illustrates an exemplary embodiment of the present disclosure, in which UTs, such as handsets, are communicating in WLANs. The UTs may be configured to support voice-over-wireless LAN (VoWLAN) communications. For example, the drawing shows handset 1 arranged in WLAN 50 having access point (AP) 1, and handset 2 operating in WLAN 60 having AP 2. Each of the handsets may be enabled to operate in a WiFi mode to communicate via the respective WLAN access point, and in a radio-access mode, such as a CDMA mode, to communicate through a radio-access network (RAN) that may be provided by a cellular communications operator.

Each of the WLAN access points serves as a base station that supports communications between UTs within the respective WLAN and connects UTs of the WLAN to outside networks. The wireless access point may contain an antenna for receiving and transmitting WiFi signals to and from UTs, and a network port, such as an Ethernet port, for connecting the WLAN to a public IP network 70, such as the Internet.

Over the public IP network 70, each of the WLAN access points may be connected to an IMS network 80 that may be provided by a cellular telecommunications operator to offer IP services to users. Although FIG. 2 shows that WLAN access points 1 and 2 are connected to different IMS networks, one skilled in the art would realize that they may be coupled to the same network.

As a public IP network is inherently unsecured, a secured tunnel is created over the public IP network 70 to connect a WLAN access point to a Security Gateway (GW) providing secured access to the IMS network 80. For example, as shown in FIG. 2, Security GW 1 provides a secure connection for the WLAN AP 1 and the Security GW 2 supports a secure communication with the WLAN AP 2. In accordance with an exemplary embodiment of the disclosure, the Security Gateway may be an intermediate system provided between the public IP network 70 and the IMS network 80, such as a firewall or a router, that creates a boundary between the networks. For example, the Security Gateway may use the IPsec protocols that may be implemented by the CSCF servers of the IMS. Alternatively, a separate security server may be provided in the network 80 to support the Security Gateway.

IPsec provides such security services as: 1) encrypting traffic to prevent unauthorized parties from reading transmitted data, 2) integrity validation to ensure that traffic is not modified along its path, 3) authentication of peers to ensure that traffic is from a trusted party, and 4) anti-replay to protect against replay of the secure session. IPsec may be implemented by a set of cryptographic protocols for securing IP packet flows and by configuring an internet key exchange (IKE) protocol.

Figure 3:
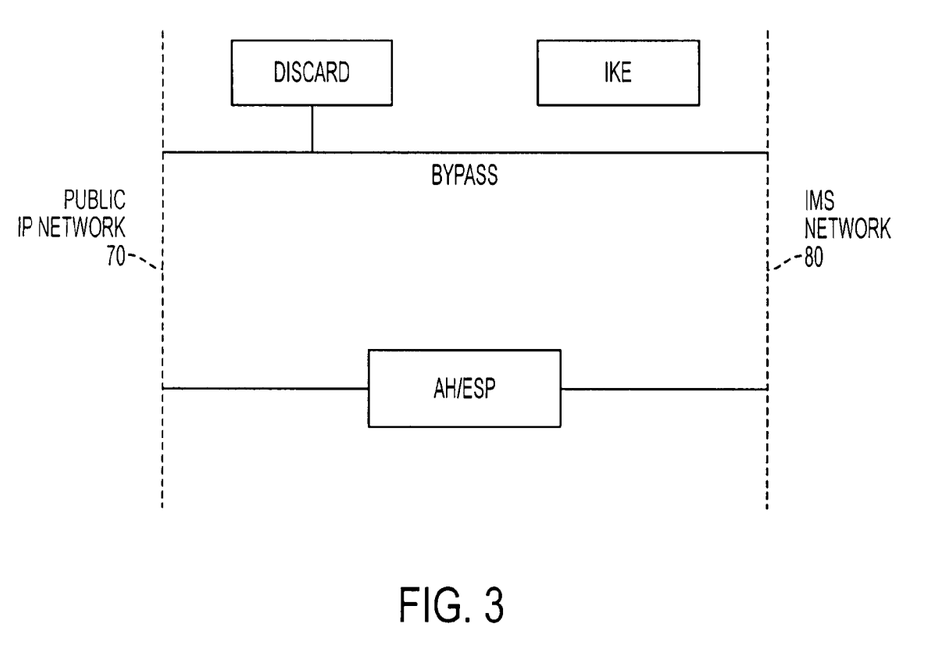
FIG. 3 depicts an example of security protocols.

FIG. 3 illustrates operation of IPsec performed in a tunnel mode at an interface between the public IP network 70 and the IMS network 80. The access to IPsec is controlled to determine whether packets crossing the boundary between the networks 70 and 80 are subject to IPsec security services or should bypass these services and be discarded. To secure IP packet flows, the IPsec uses the Authentication Header (AH) and the Encapsulating Security Payload (ESP) protocols. The AH provides data integrity and authentication by having the source node digitally sign the IP header and payload of the packet. The ESP provides data confidentiality and payload integrity using encryption based on selected cryptography algorithms.

IKE security protocol may automatically negotiate IPsec security associations and enables communications secured by IPsec protocols. In particular, IKE eliminates the need to manually specify all the IPsec security parameters in the crypto maps at both peers, allows a security administrator to specify a lifetime for the IPsec security association, allows encryption keys to change during IPsec sessions, allows dynamic authentication of peers, and allows IPsec to provide antireplay services Each Security Gateway may provide a large number of connections between WLAN access points and the IMS network 80. In a conventional system, the connections established over the Security Gateway are kept active, even when a user is not making voice calls. In case of failure of one of the Security Gateways, network services would be disrupted unless a redundant Security Gateway is provided. In a typical deployment scenario, an additional redundant Security Gateway is provided for each active Security Gateway to maintain connections established via the respective main Security Gateway when it fails for any reason. The redundant Security Gateway is not active until the respective main Security Gateway fails. Such a redundancy arrangement substantially increases the network deployment cost.

Figure 4:
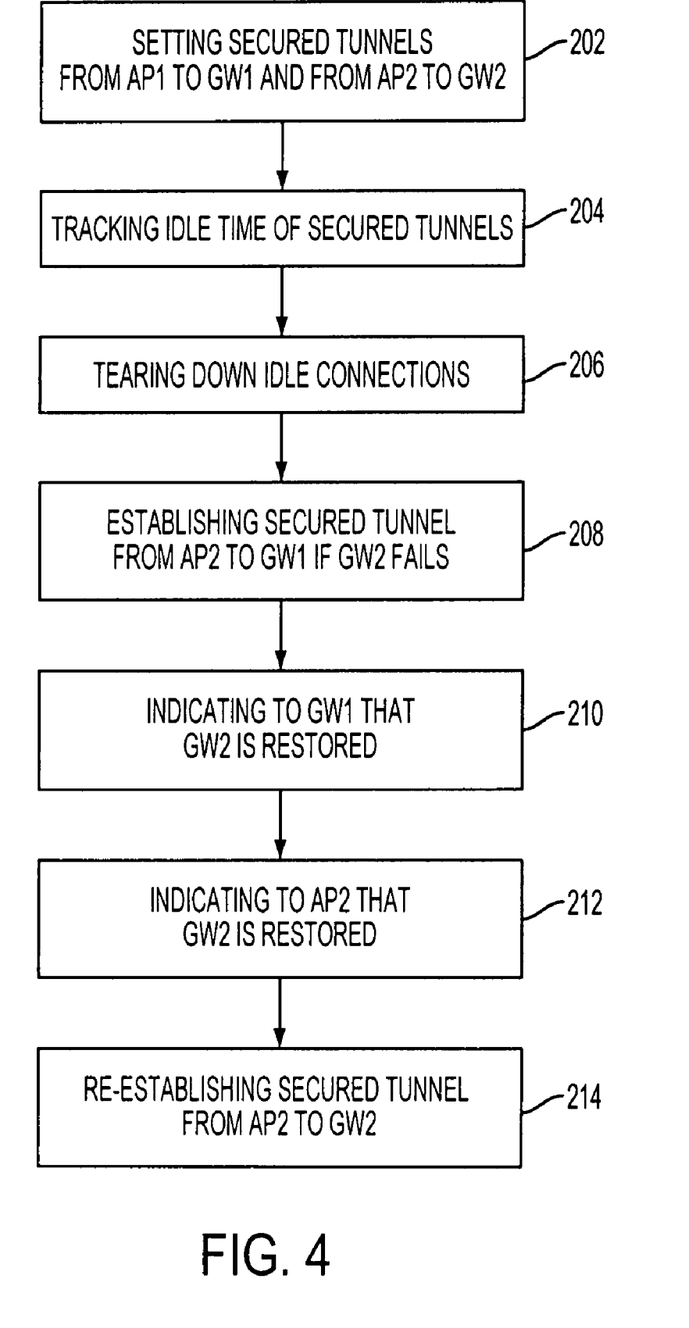
FIG. 4 is a flow chart illustrating the security gateway redundancy and optimization procedures.

To avoid providing a redundant Security Gateway for each active Security Gateway, the present disclosure offers a redundancy arrangement in which an existing active Security Gateway is used as a redundant security node for users of another active Security Gateway. FIG. 4 illustrates an example of the redundancy mechanism for Security Gateways in accordance with the present disclosure. The redundancy mechanism may be implemented using CSCF and HSS of the IMS 80. Alternatively, a separate Security Server may be provided.

For example, a WLAN AP 1 (FIG. 2) may establish a secured tunnel to Security GW 1 for providing a secure connection of user terminals (UTs) arranged in WLAN 50 to the IMS 80, and AP2 may establish a secured tunnel to Security GW 2 to provide a secure connection to the IMS 80 for the UTs arranged in WLAN 60 (block 202 in FIG. 4). In addition, access points of other WLANs may create secured tunnels to Security GW 1 and/or GW 2 to establish secure connections to the IMS 80 for the respective UTs.

In the example, the Security GW 1 operates as the primary Security GW for the access point AP 1, and the Security GW 2 operates as the primary Security GW for the access point AP 2. Both gateways are normally active. Each active Security GW may support a large number of active secured tunnels. Many of these tunnels may be idle. However, they may be maintained in an active state to reduce call setup latency when the respective user makes a call. To optimize Security GW resources, the redundancy mechanism may track idle time of each established secured tunnel (block 204). For example, a Security GW may be provided with a timer that determines a time interval during which each secured tunnel has been idle, i.e. no calls have been made over the tunnel.

If the redundancy mechanism determines that a particular secured tunnel is idle longer than a predetermined time interval, the redundancy mechanism may tear down this tunnel, i.e. remove a secure connection between the respective AP and the IMS 80 (block 206). As a result, active Security GWs are enabled to establish additional secured tunnels in case of failure of other Security GWs.

In accordance with IPsec protocol, each AP periodically checks its connection to Security GW. When one of the Security GWs, e.g. GW 2 fails (block 208), AP 2 will lose its connection with Security GW2. Thereafter, AP 2 may make a pre-configured number of attempts to re-establish a lost secure connection with Security GW 2. If these attempts fail, the AP2 may establish a secure connection to Security GW 1.

For example, each WLAN access point may be provided with IP addresses of two Security GWs assigned as primary and secondary Security GWs. During normal operations, the access point maintains a secured tunnel to the assigned primary GW. However, the access point may automatically establish a secured tunnel to the secondary Security GW after the primary Security GW fails. Some communication services provided via the secured tunnel to the failed primary Security GW may be temporarily interrupted while the WLAN access point is establishing connection to the secondary Security GW. However, if a voice call is provided via the failed primary Security GW, the call may be maintained but some audio data may be lost.

When the primary Security GW is restored, it may indicate to the secondary Security GW that it comes up. For example, Security GW1 will be informed when Security GW2 is restored (block 210). The secondary Security GW may have no information as to which APs were originally connected to the primary Security Gateway. Therefore, the secondary Security GW may be requested to initiate reporting to all connected APs that the primary Security GW is up. In particular, the secondary GW may report the IP address of a newly restored Security GW. Hence, Security GW1 will report to AP 2 that Security GW2 is restored (block 212).

As each AP is provided with the IP address of its primary Security GW, it detects that the primary Security Gateway is restored. When the AP goes into an idle or dormant mode, in which no active voice or data calls are performed, it will terminate connection to the secondary Security GW and re-establish the secure connection to the primary Security GW. For example, AP 2 will re-establish the secured tunnel to Security GW2 (block 214).

In the redundancy procedure illustrated in FIG. 4, resources of Security GWs are optimized by tearing down idle secured tunnels. In addition to, or instead of this operation, the redundancy mechanism of the present disclosure may utilize other ways of optimizing Security GW resources. For example, FIG. 5 schematically illustrates the optimization method that utilizes tracking user terminals based on their location, e.g. using HLR registration provided by the HSS.

Figure 5:
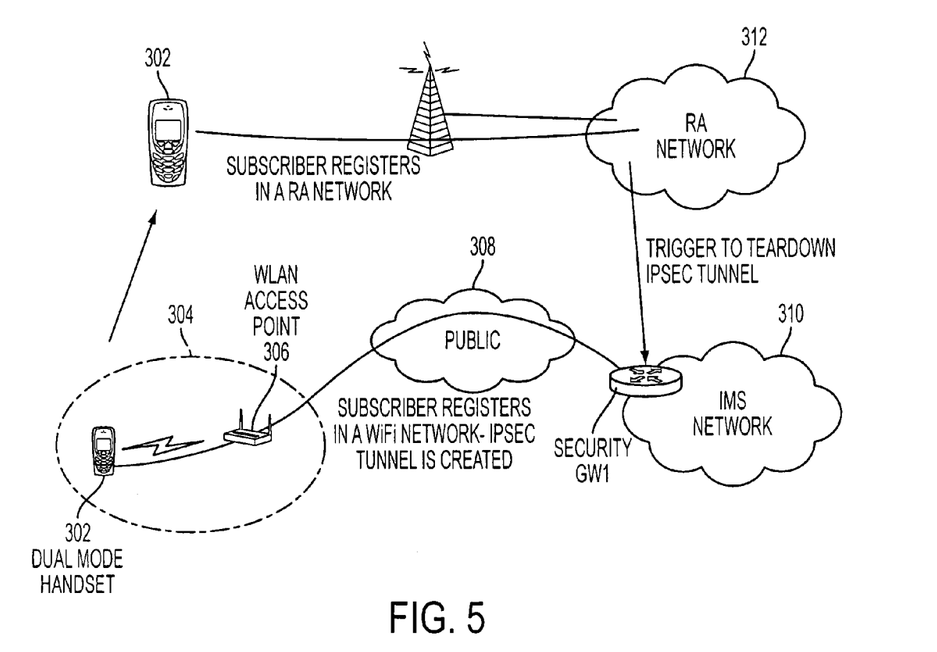
FIG. 5 illustrates an example of security gateway optimization.

A user terminal is represented in FIG. 5 by a dual mode handset 302 capable of operating in a WiFi mode and in a radio-access mode, such as CDMA. When the handset 302 registers in a WiFi network 304, a secured tunnel is created from the respective WLAN access point 306 over a public IP network 308 to a Security GW1 that provides access to an IMS network 310. When the handset 302 is disconnected from the WiFi network 304 (e.g. the user moves from home or office), the handset 302 will register on a radio-access (RA) network 312, such as a CDMA network. At that time, the HLR receives user's registration information. In response, the HLR generates a trigger to the Security GW1 instructing it to tear down the secured tunnel established with the handset 302. As a result, resources of the Security GW1 may be released to enable secure connections of other users.

Figure 6:
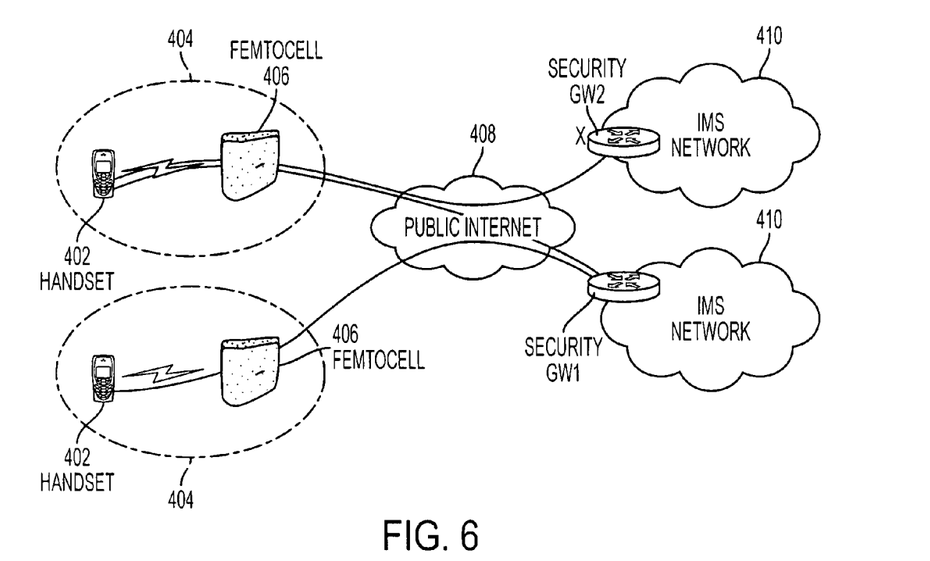
FIG. 6 depicts another exemplary redundancy arrangement for security gateways.

FIG. 6 illustrates another exemplary embodiment of the present disclosure, in which secured tunnels are created to carry a VoIP traffic from a radio access network. In this example, handsets 402 operate in local radio access networks 404, such as CDMA networks. Personal base stations 406, such as FemtoCells, are arranged in each of the networks 404 for converting radio access signals generated by the handsets 402 into IP data. The personal base station 406 may be a low power station for providing local radio access. Via a public IP network 408, each of the base stations 406 may create a secured tunnel to Security GW1 or Security GW2 so as to provide the handsets 402 with secured connection to IMS network 410. Although FIG. 6 shows that Security GW1 and Security GW2 are provided at different IMS networks, one skilled in the art would realize that multiple Security GWs may be arranged at the same IMS network.

The redundancy and resource optimization for Security GWs in FIG. 6 may be provided in a manner similar to procedures described in connection with FIGS. 4 and 5. In particular, idle time of the secured tunnels may be monitored to tear down the tunnel if its idle longer than a predetermined time interval. Also, the registration information relating to handsets 402 may be used to tear down the secured tunnel when the handset 402 moves from the local RAN 404.

While the foregoing has described what are considered to be the best mode and/or other preferred examples, it is understood that various modifications may be made therein and that the invention or inventions disclosed herein may be implemented in various forms and examples, and that they may be applied in numerous applications, only some of which have been described herein.

For example, the present disclosure is made using the example of a Security GW that may be implemented using IPsec protocol by various servers of the IMS network. However, the Security GW of the present disclosure may be implemented by a separate security server provided at a security layer of the IMS network. An exemplary security layer IMS arrangement is disclosed in the copending application No., filed on Dec. 13, 2006, entitled TECHNIQUES FOR MAN- AGING SECURITY IN NEXT GENERATION COMMUNICATION NETWORKS and assigned to the assignee of the present application.

It is intended by the following claims to claim any and all applications, modifications and variations that fall within the true scope of the present teachings.

What is claimed is:

1. A data communication system comprising:
   a first security gateway for providing a first secured communications link between a first mobile user terminal and a telecommunications network over an intermediary network,
   a second security gateway for providing a second secured communications link between a second mobile user terminal and the telecommunications network over the intermediary network, and
   a redundancy mechanism for providing a third secured communications link between the second mobile user terminal and the telecommunications network over the first security gateway, when the second security gateway fails.

2. The system of claim 1, wherein the first and second security gateways are configured to support Internet protocol (IP) communications between the intermediary network and the telecommunications network.

3. The system of claim 1, further comprising a first wireless access point for connecting the first mobile user terminal to the intermediary network, and a second wireless access point for connecting the second mobile user terminal to the intermediary network.

4. The system of claim 3, wherein the first and second user mobile terminals are configured to support voice-over-wireless LAN (VoWLAN) communications.

5. The system of claim 1, further comprising a first base station for converting a radio communication signal produced by the first mobile user terminal into first IP data supplied to the intermediary network, and a second base station for converting a radio communication signal produced by the second mobile user terminal into second IP data supplied to the intermediary network.

6. The system of claim 1, wherein the first security gateway is in an active mode to enable the first mobile user terminal to communicate over the telecommunications network, when the second security gateway is in an active mode to enable the second mobile user terminal to communicate over the telecommunications network.

7. The system of claim 1, wherein the first security gateway is configured for maintaining multiple communications links to the telecommunications network, and the redundancy mechanism is configured for disconnecting an established communications link of the multiple communications links connected to the first security gateway in accordance with a predetermined condition.

8. The system of claim 7, wherein the redundancy mechanism is configured for disconnecting the established communications link from the first security gateway if the established communications link is idle for a predetermined time period.

9. The system of claim 7, wherein the redundancy mechanism is configured to monitor idle time periods during which established communications links connected to the first security gateway are idle.

10. The system of claim 7, wherein the redundancy mechanism is configured to disconnect the established communications link from the first security gateway when a mobile user terminal associated with the established communications link is detected in a network that does not require connection via the first security gateway.

11. The system of claim 1, wherein the telecommunications network includes an IP multimedia subsystem (IMS).

12. The system of claim 11, wherein the first and second security gateways are configured to provide secure access to the IMS.

13. A system for connecting mobile user terminals over an intermediary IP network to an IP service network for providing IP services, the system comprising:
   a first security gateway for providing a first set of secured channels from a first group of mobile user terminals to the IP service network over the intermediary IP network,
   a second security gateway for providing a second set of secured channels from a second group of mobile user terminals to the IP service network over the intermediary IP network, and
   a redundancy mechanism for providing a secured channel from a mobile user terminal of the second group to the IP service network using the first security gateway when the second security gateway fails.

14. The system of claim 13, wherein the first and second security gateways are configured to support secure IP communications between the intermediary IP network and the IP service network.

15. The system of claim 14, wherein the redundancy mechanism is configured for reducing the number of secured channels of the first set established between the first group of mobile terminals and the IP service network over the first security gateway in accordance with a predetermined condition.

16. The system of claim 15, wherein the redundancy mechanism is configured to disconnect a secured channel of the first set from the first security gateway when the secured channel is idle for a predetermined time period.

17. The system of claim 16, wherein the redundancy mechanism is configured to monitor the secured channels to determine time periods when the secured channels are idle.

18. The system of claim 13, wherein the first group of mobile user terminals are arranged in a WLAN.

19. The system of claim 18, wherein the redundancy mechanism is configured for disconnecting a secured channel established from a mobile user terminal of the first group to the IP service network when the mobile user terminal is disconnected from the WLAN.

20. The system of claim 13, wherein the first group of mobile user terminals are arranged in a radio access network having a base station for converting a radio signal produced by a mobile user terminal into IP signal transferred to the IP service network over the intermediary IP network.

21. The system of claim 20, wherein the redundancy mechanism is configured for disconnecting a secured channel established from a mobile user terminal of the first group to the IP service network when the mobile user terminal is disconnected from the radio access network.

22. A method of providing communications between mobile terminals and an IP service network over an intermediary IP network, comprising the steps of:
   maintaining a first set of secured channels from a first group of mobile terminals to the IP service network over the intermediary IP network using a first security gateway,
   maintaining a second set of secured channels from a second group of mobile terminals to the IP service network over the intermediary IP network using a second security gateway, and
   establishing a secured channel from a mobile terminal of the second group to the IP service network over the intermediary IP network using the first security gateway when the second security gateway fails.

23. The method of claim 22, further comprising the step of reducing the number of secured channels in the first set in accordance with a predetermined condition.

24. The method of claim 23, wherein a secured channel in the first set is disconnected from the first security gateway when the secured channel is idle for a predetermined time period.

25. The method of claim 23, wherein the first group of mobile terminals are arranged in a local network, and a secured channel in the first set is disconnected from the first security gateway when a mobile terminal associated with the secured channel is disconnected from the local network.

26. The method of claim 22, wherein the first security gateway is informed when the second security gateway is restored after failure.

27. The method of claim 26, wherein the first security gateway provides information that the second security gateway is restored over communications links connected to the first security gateway.

* * * * *

UNITED STATES PATENT AND TRADEMARK OFFICE
CERTIFICATE OF CORRECTION

PATENT NO.        : 7,652,984 B1                                           Page 1 of 1
APPLICATION NO.   : 11/717663
DATED             : January 26, 2010
INVENTOR(S)       : Lalit Ratilal Kotecha It is certified that error appears in the above-identified patent and that said Letters Patent is hereby corrected as shown below:

On the title page of the patent, under section "(73) Assignee", please change

"Cello Partnership" to --Cellco Partnership d/b/a Verizon Wireless--.

Signed and Sealed this

Eighth Day of June, 2010

David J. Kappos
*Director of the United States Patent and Trademark Office*